(12) United States Patent
Anschel et al.

(10) Patent No.: US 8,449,250 B2
(45) Date of Patent: May 28, 2013

(54) DUCT FOR CHANGING DIRECTION OF FLOW, PARTICULARLY FOR TURBOCHARGER COMPRESSOR INLET

(75) Inventors: Paul Anschel, Asheville, NC (US); Stephen Roby, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 525 days.

(21) Appl. No.: 12/682,793

(22) PCT Filed: Oct. 15, 2008

(86) PCT No.: PCT/US2008/079978
§ 371 (c)(1),
(2), (4) Date: Apr. 13, 2010

(87) PCT Pub. No.: WO2009/052170
PCT Pub. Date: Apr. 23, 2009

(65) Prior Publication Data
US 2010/0221107 A1    Sep. 2, 2010

Related U.S. Application Data

(60) Provisional application No. 60/981,271, filed on Oct. 19, 2007.

(51) Int. Cl.
*F01D 25/00* (2006.01)

(52) U.S. Cl.
USPC .................................... 415/206; 415/184

(58) Field of Classification Search
USPC .............. 415/203, 205, 206, 184, 212.1, 912
See application file for complete search history.

(56) References Cited

U.S. PATENT DOCUMENTS

| | | | |
|---|---|---|---|
| 4,693,084 A * | 9/1987 | Ahrens | 60/599 |
| 5,269,650 A * | 12/1993 | Benson | 415/182.1 |
| 5,807,073 A * | 9/1998 | Jensen et al. | 415/206 |
| 6,520,738 B2 * | 2/2003 | Sheoran et al. | 415/205 |
| 7,562,528 B2 * | 7/2009 | Wood | 60/602 |

* cited by examiner

*Primary Examiner* — Edward Look
*Assistant Examiner* — Liam McDowell
(74) *Attorney, Agent, or Firm* — William G. Anderson; Stephan A. Pendorf; Patent Central LLC

(57) ABSTRACT

A direction changing flow duct, for example, a compressor inlet duct (34) for a turbocharger compressor cover, wherein the direction of flow is made to change abruptly in a short distance. The direction changing segment is designed to provide a balanced output, optimize air flow, minimize pressure drop, and maintain compressor efficiency. This can be accomplished by providing a bulge (81, 83, 84) extending radially inwards into a first duct segment, outward bulges perpendicular to the inward bulge, for promoting flow attachment along the walls of the duct.

10 Claims, 11 Drawing Sheets

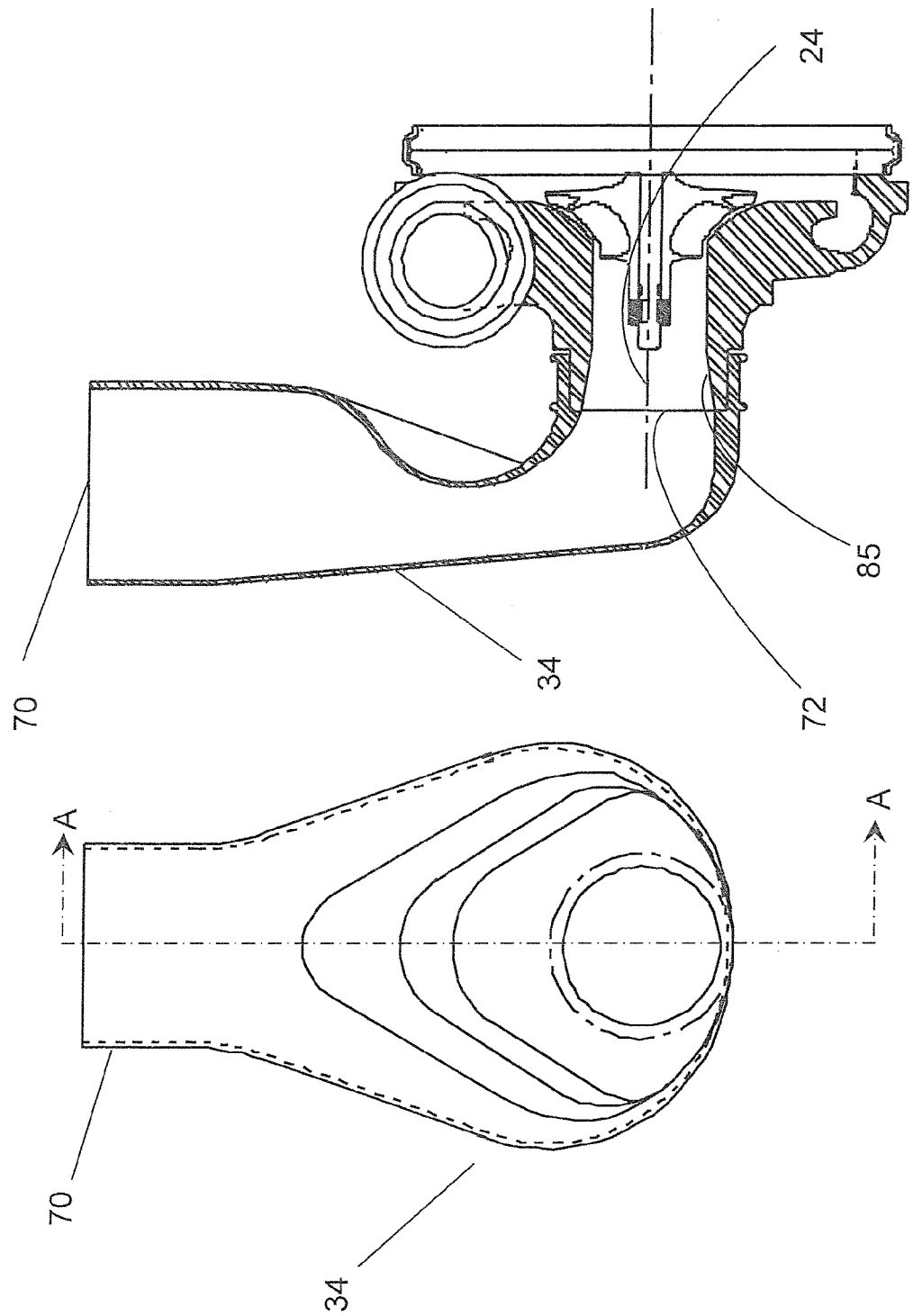

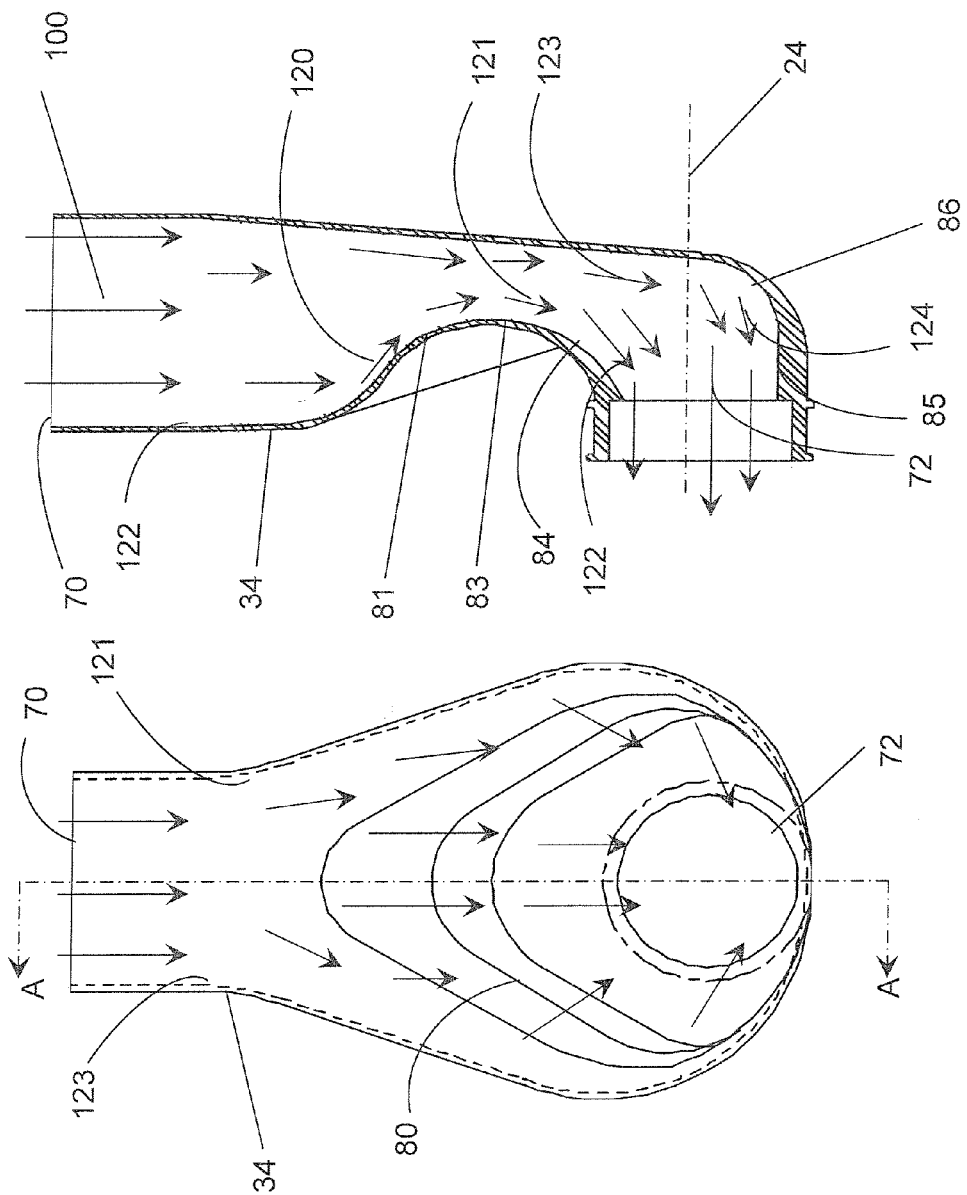

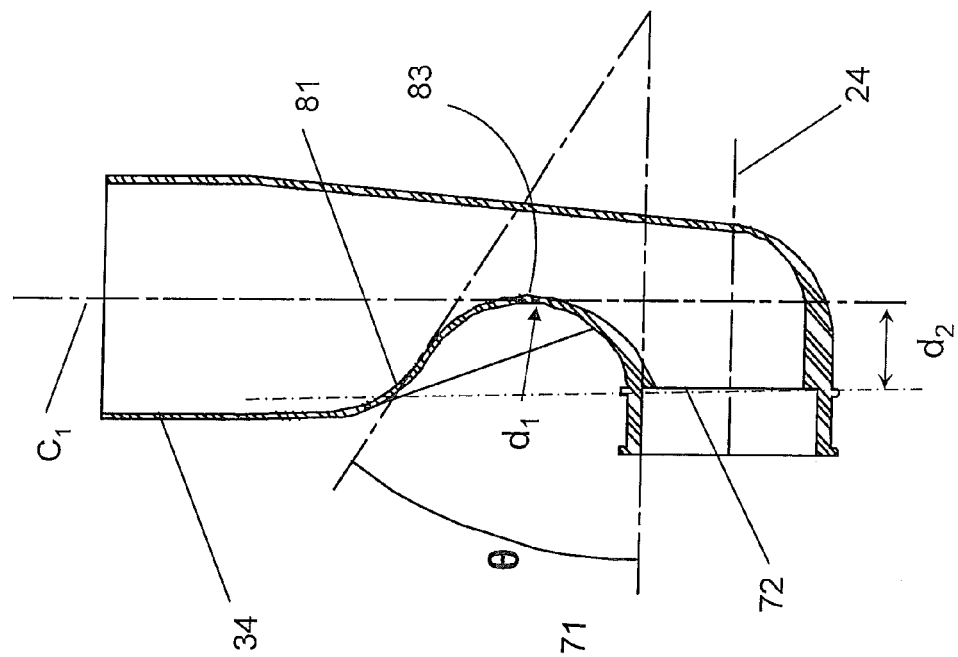
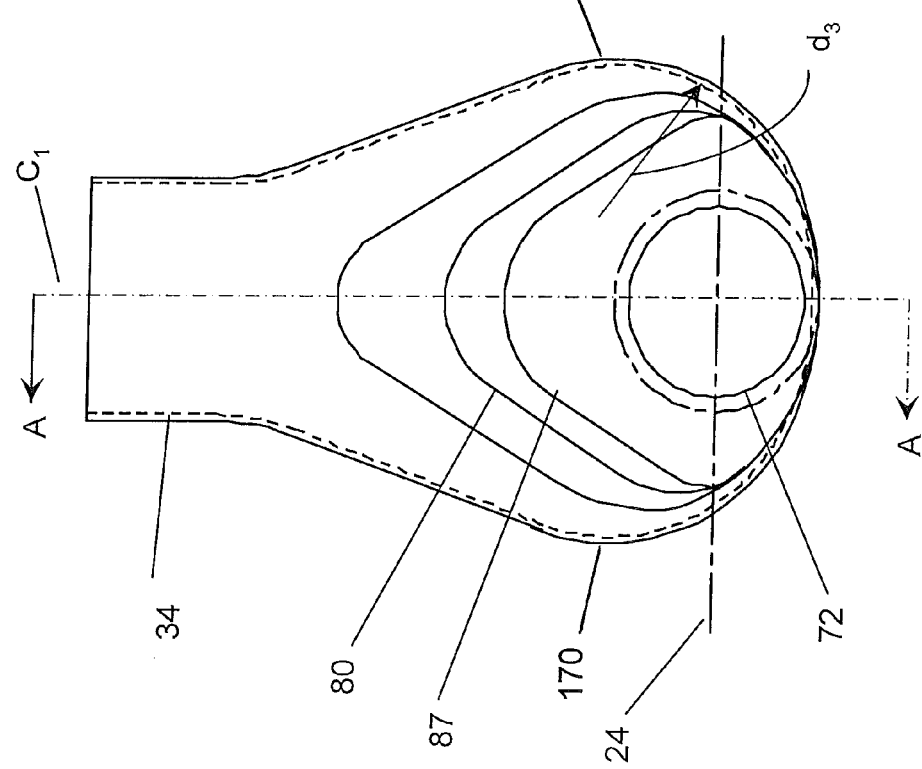

DUCT FOR CHANGING DIRECTION OF FLOW, PARTICULARLY FOR TURBOCHARGER COMPRESSOR INLET

BACKGROUND OF THE INVENTION

1. Field of the Invention

The present invention relates to a direction changing flow duct, for example, a compressor inlet duct for a turbocharger, wherein the direction of flow has to change abruptly in a short distance.

2. Description of the Related Art

Turbochargers are widely used on internal combustion engines, and in the past have been particularly associated commercially with large diesel engines, especially on-highway trucks, agriculture, off-highway and marine applications. Turbochargers are becoming more common on gasoline powered automobiles and are required on Diesel automobiles to meet emissions regulations. Engine exhaust gases are directed to and drive a turbine, and the turbine shaft is connected to and drives the compressor. Ambient air is drawn through a filter and then into, and compressed by, the turbocharger compressor and fed into the intake manifold of the engine. The design and function of turbochargers are described in detail in the prior art, for example, U.S. Pat. Nos. 4,705,463; 5,399,064; and 6,164,931, the disclosures of which are incorporated herein by reference.

Turbocharged vehicles are required to meet increasingly stringent emissions standards. Engines are being provided with auxiliary systems to accomplish this and other objectives, which systems take up space in the engine compartment. In this environment, it is a common problem that space in the engine compartment is limited. It is also standard that all air supplied to a turbocharger compressor must first pass through an air filter to remove any particulate matter that might damage the turbocharger and/or the engine. Due to space limitations, the air filter and compressor components frequently cannot be located close together in the engine compartment, and in these ducts the air filter is connected to the compressor via a an intake duct.

FIG. 1 depicts a typical, straight six, commercial Diesel engine installation, in a truck. The engine block (1) usually straddles the front axle (2) to provide desired weight distribution over said axle. It is natural, from an exhaust flow perspective, to have the turbocharger mounted centrally on the exhaust manifold (12). This mounting position means that the turbocharger is often adjacent to the front wheel (5) and the vehicle suspension, thus creating a side-to-side space constraint. The air filter (6) is positioned to limit the compromise between airflow from the vehicle to the filter (6) and the length of the duct (61) from the filter (6) to the compressor cover (20). A product of this compromise is the distance from the compressor cover (20) to the engine ancillaries such as the alternator (7) and the air conditioner compressor (8). These engine ancillary devices must be positioned at the front of the engine as they are often driven off the serpentine belt (9), which is driven by a pulley mounted on the nose of the engine crankshaft.

The compressor must be configured such that the duct (21) connecting the compressor cover (20) to the vehicle intercooler (6) has a clear run. The turbocharger must also be positioned such that the turbine stage (10) of the turbocharger is such that the exhaust pipe (11) has a reasonable run to the back of the vehicle. The exhaust pipe has to snake its way from the turbocharger, around the chassis rail (4), avoiding items which may be negatively affected by the exhaust temperature, like fuel and air tanks, tires etc. The exhaust pipe is usually 10% to 20% larger than the compressor discharge or inlet, so combined with the temperature of the pipe, the degree of difficulty in determining an appropriate, three dimensional route for the pipe means that this aspect of the vehicle installation design tends to take predominance over the compressor inlet ducting. The resultant of these configuration compromises is often that the compressor inlet is very close to other engine components.

Since the compressor inlet is often located near these obstructions, the air intake duct (61) from the air filter (6) to the compressor (20) has to be squeezed in around these components. Since the air filter is usually located either adjacent to the front of the engine, or on the vehicle firewall adjacent to the rear of the engine, the compressor-end of the duct from the air filter is frequently oriented perpendicular to the turbocharger centerline. In some off highway installations the exhaust discharges to the front of the vehicle so the turbocharger is reversed and the air inlet system is usually in conflict with a separate set of obstacles. In any case the inlet to the compressor is usually the last thought in the design and as a consequence it is often found to be lacking, from the turbocharger aerodynamic sense.

To one well versed in the art it is common knowledge that a rule of thumb is to allow a length of five diameters after a bend or direction changing modification to a duct, before introducing the flow downstream to a device. Such direction changing bends or elbows are well known. Also well known are the deficiencies inherent in such direction changing ducts, which were tested by the inventors to confirm the results of such bends.

First, at the inlet to the duct the pressure gradient at any point in the plane perpendicular to the centerline of the duct is small usually due to the length of the duct. Downstream of the bend in the duct the pressure gradient in the plane shown in FIG. 2 is so extreme as to sometimes not provide positive pressure past the centerline of the compressor wheel, measured in a plane perpendicular to the axis of the compressor wheel. In aerodynamic testing of a commercially available, as seen in FIG. 2, with a tight radius bend, it was seen that, the flow of air (100) at the inlet to the duct was uniform across the plane of the inlet. As the flow of inlet air (101) reaches the bend in the duct, the energy is sufficient to support attached flow around the initial radius of the bend. Further around the tight inner bend radius separation (112) of the flow is sufficiently significant that the remainder of the flow (102) does not reach the centerline of the duct.

Second, typical turbocharger compressor wheel blades are excited through several orders. For commercial turbochargers, the design criteria typically are such that the blades are designed to exclude up to the fourth order of vibration. For a reasonable pressure gradient across the inlet to the compressor wheel, this design criteria is sufficient to prevent HCF failure in the blades over a turbocharger compressor's multiple lifetimes. However when the pressure gradient across the inlet to the compressor wheel is severe, as in the case of the tested inlet ducts in FIG. 2 through 6, the excitation is sufficient to cause HCF failure in blades of compressor wheels which would otherwise be OK. In these non-symmetric pressure gradient ducts each blade of the compressor wheel sees a once-per-revolution pressure pulse ultimately leading to HCF failures.

Third, as a result of flow separation in the bend, there is a significant average pressure drop across the compressor wheel inlet. This change in inlet pressure or flow can, in the worst case, cause the compressor to go into surge, or, in a less violent case, cause a loss of pressure ratio and efficiency, as can be seen in FIG. 9.

In general, those working in this art have accepted the aerodynamic inefficiencies discussed above with resignation, using a simple elbow as shown in FIG. 2.

The problems of the simple tight bend, as seen in FIG. 2, are also seen in commercially available inlet duct bends seen in FIG. 3, FIG. 4 and FIGS. 6A and B. In the duct bend in FIG. 4 the direction changing segment is somewhat disc-shaped, with a planar surface (32) perpendicular to the wheel axis, the increased volume of this shape allowing the axial space for the inlet bend to be compressed even more than that of the simple tight bend (31) in FIG. 3. This means that the airflow in the zone of the inner bend has to flow around an even tighter radius, resulting in flow separation (113, 114) around the inner bend and some separation (106) due to the cavity at the bottom of the bend. In this case the majority of the flow (104, 107) which reaches the compressor wheel is confined to the lower half of the wheel only.

In the arrangement seen in FIG. 6A and FIG. 6B, a configuration, which is in production, has the air cleaner in close proximity to the compressor inlet. The separated flow on the inner radius means that flow separation (116) occurs to a high degree and testing revealed that this degree of separation was sufficient to cause the turbocharger to go into premature surge, sufficient to raise the temperature of the inlet air enough to melt the plastic of the duct and even some of the media in the filter.

This problem is addressed in a direction changing duct as shown in FIG. 5A and FIG. 5B and disclosed in United States Patent Application Publication No. 20040134461 (Bishop). The duct includes a 90° bend for changing the direction of flow of compressed air being supplied from a compressor to a carburetor. To ensure delivery of the same amount of flow to the front and rear barrels of a four-barrel carburetor, and to address the problem shown in FIGS. 2, 3, 4, 6 a flow divider is provided extending diametrically through the passage from the inlet to the outlet, dividing flow into separate upper and lower channels (115). The lower channel delivers air to the front barrels and the upper channel delivers air to the rear barrels of the carburetor. However, besides the complexity of manufacturing a curved duct with an integral flow divider, and the probability of such a flow divider breaking loose or otherwise fail, there is a more significant problem. Flow velocity and pressure measured over the area of the duct outlet is not even. This may not be a problem in the Bishop environment of use, which is supply of compressed air to a carburetor, but it would be a problem in applications where a more balanced output is required, such as in the supply of air to a compressor wheel inlet. For such a supply of air to the compressor wheel inlet where slender compressor wheel blades are used, there is the increase of HCF and likelihood of failure, as discussed above.

There are many other configurations of turbocharger positioning not being conducive to acceptable aerodynamics of the inlet. This situation exists in both commercial diesel and automotive applications. On Vee engines, in ether category, the requirements of packaging often force the turbocharger to sit sideways in the valley of the engine. Because of this configuration, the compressor inlet is often cramped by the cylinder heads. In some twin turbocharger vee engine configurations the turbocharger sits in a position low outside the engine, adjacent to the front of the engine, so a tight compound bend is required from the air cleaner duct to the compressor air inlet. There is thus a need for a direction changing duct able to change the direction of flow of a fluid in a short distance and provide a greater balance of flow and pressure over the entire outlet area, and to do this with minimal pressure drop. There is a further need for such a duct that is able to increase the uniformity as described above, while providing a cost-effective and reliable component of the turbocharger system.

SUMMARY OF THE INVENTION

The present inventors have extensively investigated the fluid dynamics in direction-changing ducts, such as turbocharger compressor inlet ducts of the type in which the intake duct is oriented generally perpendicular to the axis of the turbocharger compressor.

A turbocharger compressor inlet duct designed to facilitate change in direction of flow of a fluid, yet provide a substantially uniform flow velocity distribution at the duct outlet (i.e., the entrance of the compressor wheel) with low pressure loss is provided. A compact compressor inlet duct designed to minimize space requirement (tight axial fit) when installed in an engine compartment is provided. The problem should be solved in an economical manner. The duct should not include internal structures liable to breakage or failure.

BRIEF DESCRIPTION OF THE DRAWINGS

The present invention is illustrated by way of example and not limitation in the accompanying drawings in which like references indicate similar parts, and in which:

FIG. 7A,B is a side elevation section and a front elevation of an exemplary embodiment;

FIG. 8A,B is a front (FIG. 8A) elevation and a side, sectioned elevation (FIG. 8B) showing airflow through the exemplary embodiment;

FIG. 9A,B is a front (FIG. 9A) elevation and a side, sectioned elevation (FIG. 9B) showing the geometry of the exemplary embodiment;

DETAILED DESCRIPTION OF THE INVENTION

The present invention was made after extensive investigation into conventional direction changing ducts, including use of modeling, computational flow dynamics (CFD) and real time testing. Extensive work has resulted in a highly evolved flow direction changing segment design. To better understand the breakthrough represented by the present invention, it is necessary to understand the common defect in conventional prior art direction changing segment designs.

The present invention will be described by way of an inlet duct for the inlet a compressor of a turbocharger, although it will be readily apparent that the invention has numerous diverse applications.

Figure 1:
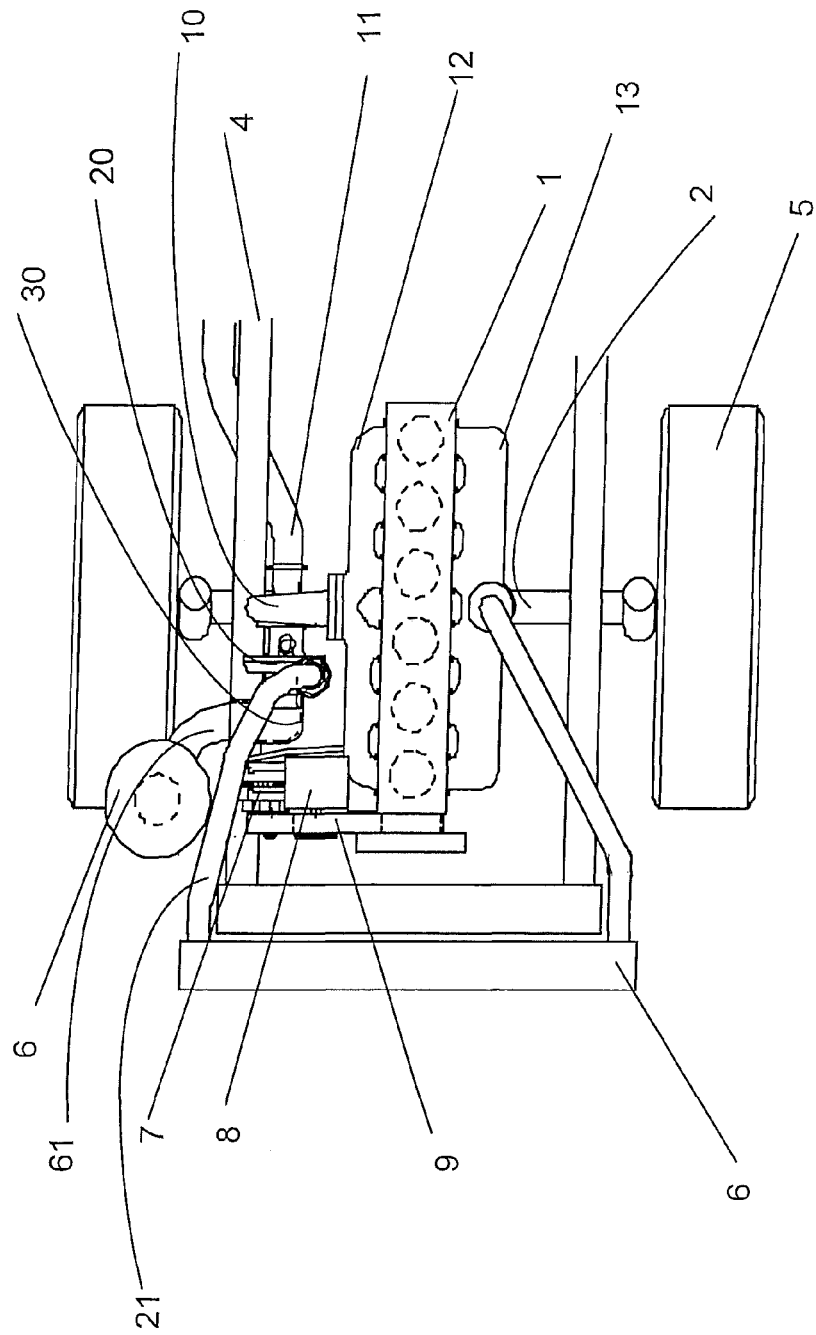
FIG. 1 is a plan view of a typical straight six engine configuration.
Figure 2:
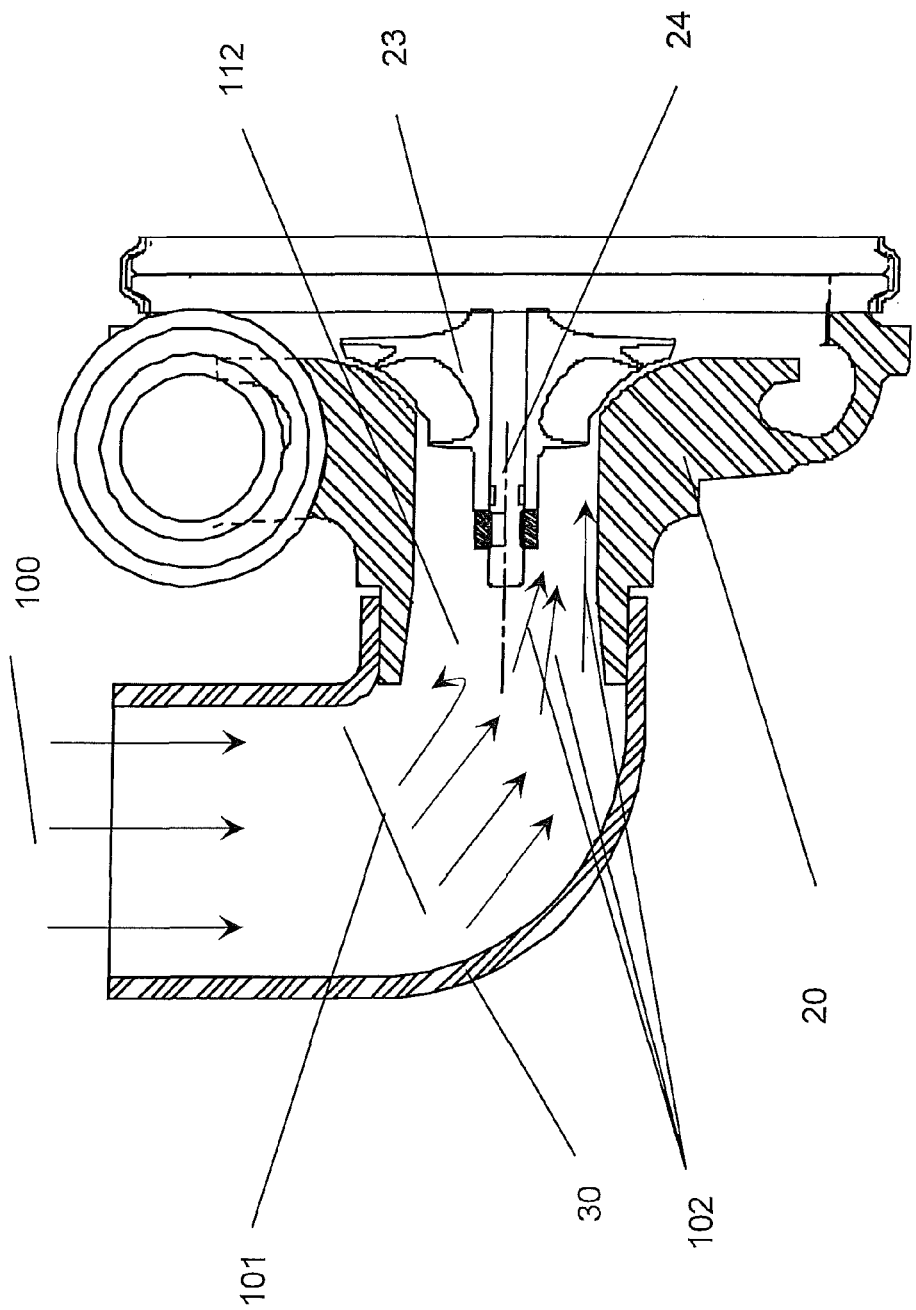
FIG. 2 is a side elevation section view of a prior art, commercially available inlet elbow, mounted on a compressor cover.
Figure 3:
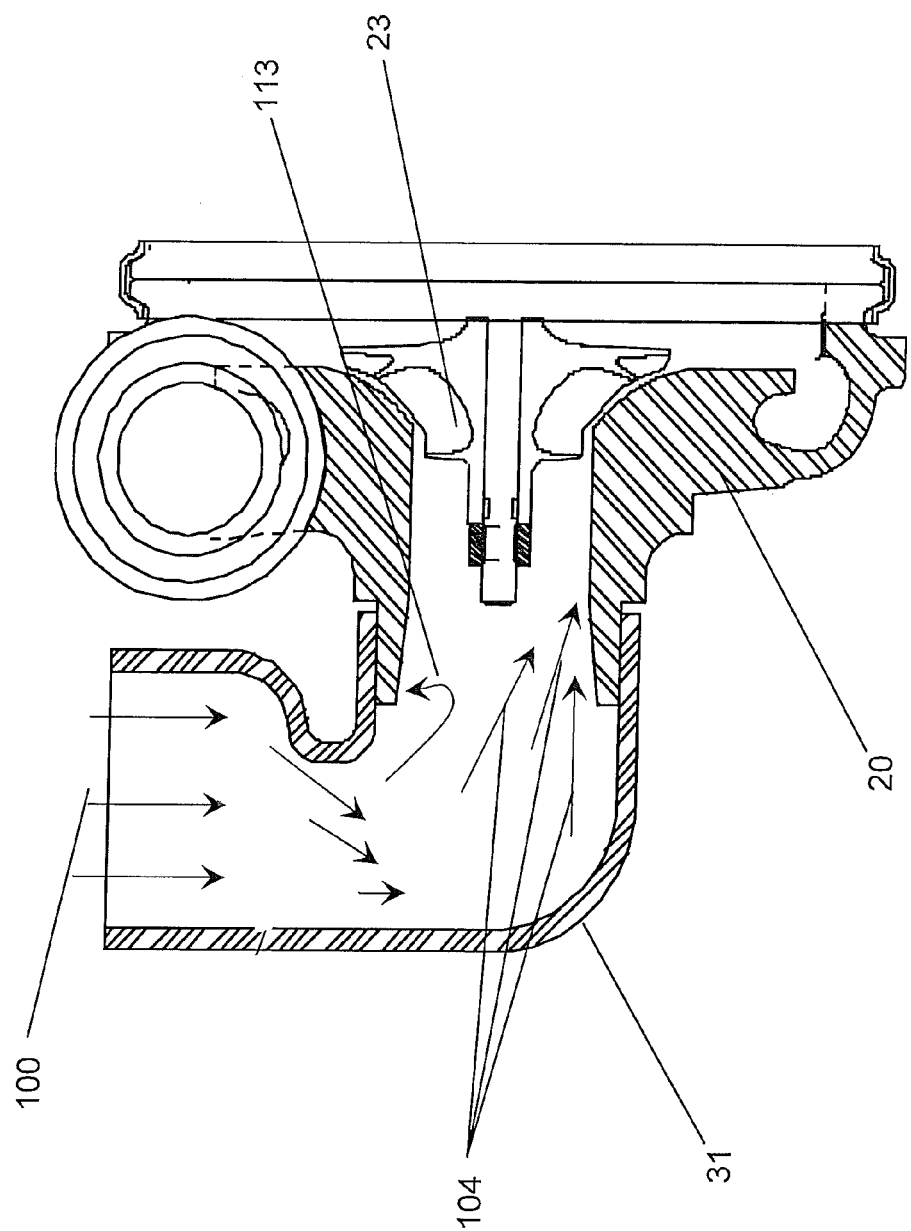
FIG. 3 is a side elevation section view of another prior art, commercially available, tighter axial fit, inlet elbow, mounted on a compressor cover.

FIG. 2 shows a typical molded pipe bend (30). As can be seen by the flow arrows, the incoming flow (100) resists changing direction and tends to carry to the outside of the bend. Flow (112) thus tends to separate from the wall at the sharp curvature of the inner bend and thus becomes turbulent flow. The result, measured at the duct outlet, is high flow velocity, relatively parallel on the outside of the bend, and low turbulent flow, on the inside of the bend. In testing it was seen that the pressure gradation across the inlet of the compressor cover was such that the positive pressure did not reach the centerline (24) of the compressor wheel. These flow and pressure differentials cause a once-per-revolution pulse that impacts the compressor wheel which is highly detrimental to both the HCF life of the compressor wheel blades, and to the performance of the compressor stage.

Figure 5A:
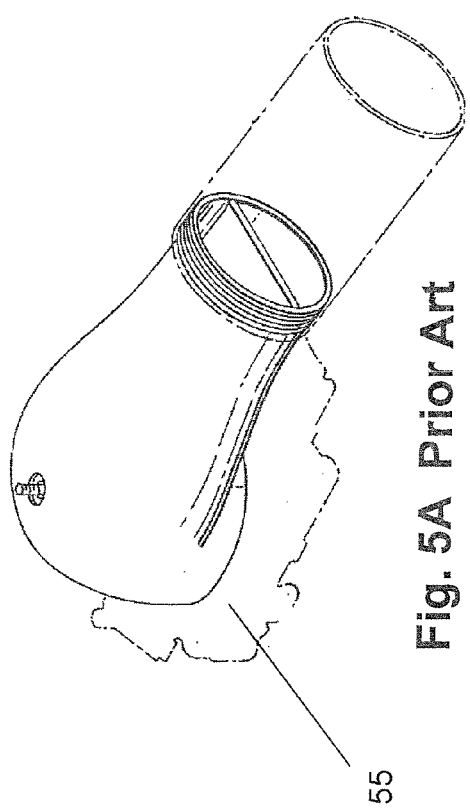
FIG. 5A,B shows a side elevation and an isometric view of the inlet bend taught in US Patent Application Publication No. 20040134461 (Bishop)
Figure 5B:
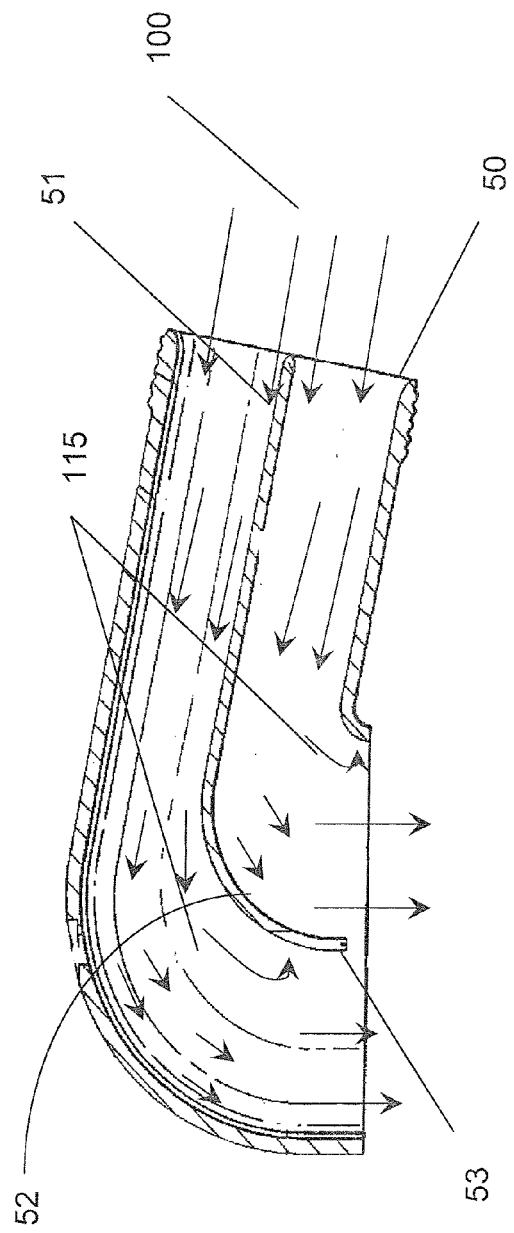

FIG. 5A and FIG. 5B show a design disclosed in United States Patent Application Publication No. 20040134461 (Bishop) and adapted to attempt to overcome an aspect of the problem discussed in association with FIG. 2. In this design, a flow divider (51) is provided which divides the passage into two channels. The flow divider extends from the inlet (50), through the bend passage portion (52), to the outlet (53). The flow divider divides the flow into two channels, with a lower channel delivering air to the front barrels of a four-barrel carburetor and an upper channel delivering air to the rear barrels of a four-barrel carburetor. Bishop thus uses a barrier to ensure that the same amount of air is delivered to both the front and rear barrels of the carburetor. However, since the Bishop elbow is for an inlet of a carburetor (55) located downstream of the compressor, there is no concern for the adverse impact pressure differentials that would occur on compressor wheel blades, and the problem of pressure differentials is not addressed.

Figure 4:
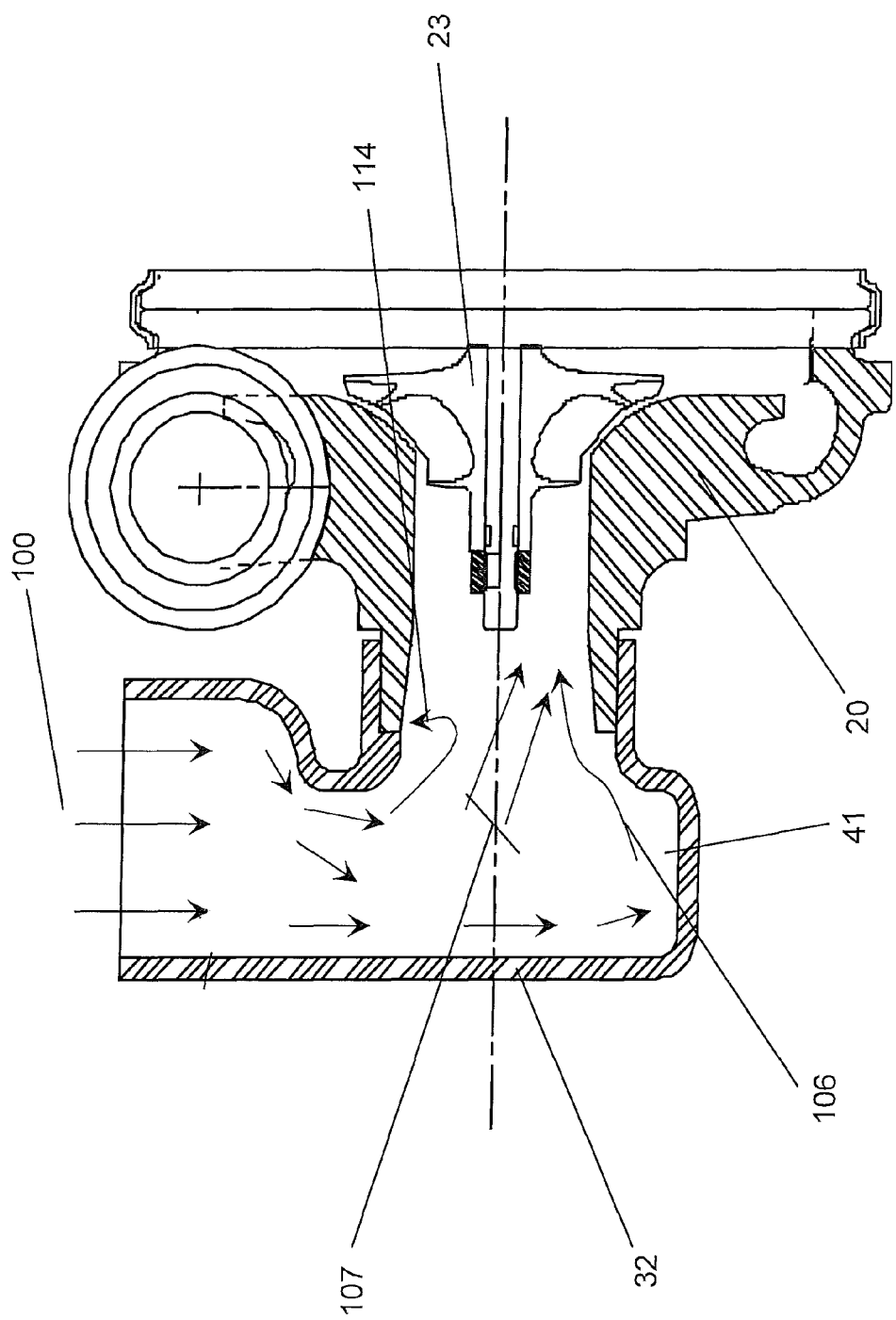
FIG. 4 is a side elevation section view of another prior art, commercially available, tighter axial fit, square bottomed, inlet elbow, mounted on a compressor cover.

FIG. 4 is a sectional view of a popular commercial compressor inlet duct (32) for large turbo Diesel engines. As can be seen from the arrows representing flow, the incoming airflow (100), is drawn through the neck between the tight inner bend and the outer surface of the duct. Separation (114) occurs downstream of the tight inner bend while the outer flow regime forms a high pressure zone in the cavity at the bottom (41) of the duct, which assists the turning of the majority of the airflow (114) towards the compressor wheel (23). Aerodynamics are poor in the transition/bend area, with the result that this design creates problems for the compressor wheel. The result, measured at the duct outlet, is high flow velocity, on the outside of the bend and low turbulent flow, on the inside of the bend. In testing of this bend it was also seen that the pressure gradation across the inlet of the compressor cover was such that the positive pressure did not reach the centerline (24) of the compressor wheel. These flow and pressure differentials present a once-per-revolution pulse to the compressor wheel which is highly detrimental to both the HCF life of the compressor wheel blades, and to the performance of the compressor stage.

Figures 6A, 6B:
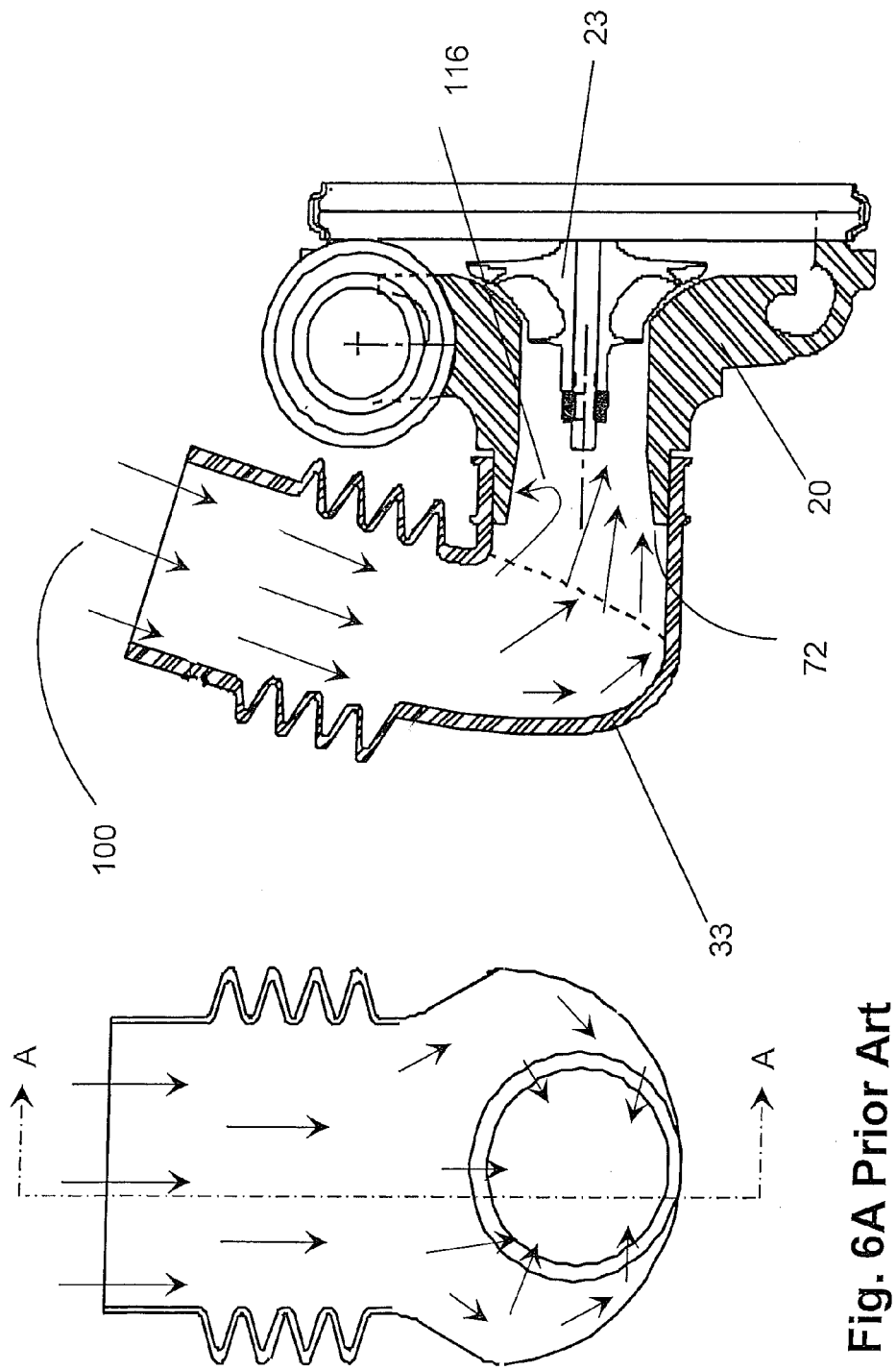
FIG. 6A,B is a side elevation section view of another prior art, commercially available, inlet elbow, mounted on a compressor cover.

The inlet in FIG. 6A and FIG. 6B is a production item which is one piece plastic from the bottom of the air filter (6) to the compressor inlet (72). The results of testing showed that the separation (116) around the inner bend was so extreme as to cause the turbocharger to go into premature surge, which raised the temperature of the air upstream of the compressor to levels such that the temperature melted both the duct and the lower levels of the filter media. As in the above inlets this phenomenon also produced detrimental HCF behavior in the compressor wheel blades.

The present inventors began with the idea of trying to design a bend in a manner which encouraged the inside bend flow component to remain attached to the inside of the bend, and to present a uniform pressure distribution to the compressor wheel.

After extensive work the present inventors developed a flow direction changing transition segment, shown in FIG. 7 by way of example as a compressor inlet duct (34), adapted to induce flow attachment to the inside bend. In the exemplary embodiment, the duct includes a first duct with an inlet (70), a second duct with a flow axis through outlet (72) most commonly at a turning angle of about 90 degrees with respect to a first duct flow axis through inlet (70). However, the present disclosure contemplates other turning angles being formed which may be between 60 degrees to 120 degrees and more commonly between 75 degrees to 105 degrees and the benefits of the present invention are particularly pronounced at about 90 degrees. The angle in question is more commonly determined by the architecture of engine components.

The flow pattern in the exemplary compressor inlet duct (34) is shown in FIGS. 8A and 8B. In accordance with the exemplary embodiment, the flow on the inside of the bend, viewed along a cross section defined by a plane extending through the centerline of the duct upstream of the bend ("X"-axis) as well as the centerline of the duct downstream of the bend ("Y"-axis) (24), as illustrated in FIG. 8B, encounters a surface of a radially inwardly protruding bulge or restriction (81). The upstream side of the inward bulge (81) causes a temporary increase in static pressure, which has the effect of encouraging flow to attach along the bulge surface. After the apex (83) of the bulge (81), there is the downstream side (84) of the bulge, which transitions into, or forms the, inside of the direction-changing bend and has the effect of providing a more generous radius for the inside of the bend than heretofore provided, which is much more favorable to maintenance of flow attachment than the conventional sharp bend. In a preferred design of this embodiment the terminus of the downstream curve (84) is tangential to the opposite inside wall (85) of the compressor cover inlet. The outward bulges (170,171) extend outward (Z-axis) relative to the first duct section a distance ($d_3$) of from 0.5 to 2.0 times, preferably 0.2 to 1.0 times, the diameter of the second duct outlet (72).

In the view shown in FIG. 8B, the incoming airflow (100) from the filter is accelerated around the bulge (81) such that the airflow (120,121, 122) remains attached to the inner wall and flows into the compressor cover (20) parallel to the compressor wheel axis (24), and the compressor wall (85). The outside bend (86) flow component (123, 124) remains attached to the outside wall. The flow near the centerline of the duct averages these two peripheral flows. The resultant of this geometry is that the flow across the duct outlet (72) is close to parallel to the compressor wheel centerline (24) at all regions in the plane of the duct outlet (72). Since the velocity and flow are uniform at the plane of the exit of the duct (which is the entrance to the compressor cover) the pressure distribution presented to the compressor wheel is much more uniform, reducing the propensity for HCF issues and increasing the average pressure available to the compressor wheel which reduces the opportunity for premature surge.

The flow is however three dimensional and thus more complex than can be illustrated in FIG. 8B alone. As can be seen in FIG. 8A, 8B, as the flow approaches the X/Y-axis bulge or restriction, the duct is also expanding sideways ("Z" axis), thereby maintaining the flow cross-sectional area, preventing pressure drop, with a gentle curvature of the directed flow, allowing air flow to follow or attach to the sideways widening walls of the duct. As the duct approaches the direction-changing area, the widened walls of the duct begin to narrow again, and meet again after passing the compressor inlet. This way the air flow can be visualized as branching into at least three main areas of flow—(a) flow along the centerline (X/Y) where the air is accelerated, attaches to a bulge, and changes direction while attached to the bulge, and (b) flow along the sideways widening areas of the duct and transitioning into a downward half vortex or half cork-screw. The result of the three branches of flow with gradual change of direction of flow, rather than one "hit the wall" change of direction, is an even and controlled change in direction, yet still within a very confined space as dictated by the narrow confines of an engine compartment. The problem of flow separation which occurs at the inner diameter, sharp bend of the conventional transition segments as shown in FIGS. 2 through 6 is overcome in a simple, reliable and eloquent way which does not impede flow or cause a significant pressure drop in accordance with the exemplary embodiment described herein.

Finally, the widening (80) of the transition section, as seen more clearly in FIGS. 9A and 9B, maintains the flow cross-sectional area, preventing pressure drop. This widening also tends to stabilize flow and reduce pre-swirl. A widening in this area is not a space problem in engine compartments, since the area (diameter) allowed for the direction changing segment is generally the same as the compressor housing diameter.

Preferably, the curvature of "bulge" of the inside of the bend (81) (X/Y axis) has a radius from 0.5 to 2.0, more preferably from 0.7 to 1.2 times, the diameter of the duct outlet (72). In comparison, in the elbows shown in FIGS. 2, 3, 4, 6, the radius of the sharp inside bend is approximately 0.1 times the duct outlet diameter.

The bulge (81) can extend radially inwards (Y-axis in direction opposite of second duct outlet flow direction) a distance from 0.1 to 0.5 times, preferably 0.15 to 0.3 times, the diameter of the duct outlet (72). For example, where a duct outlet diameter of about 93 mm is used, the bulge (81) can extend radially inwards at apex (83) a distance $d_1$ of about 9 to 46 mm, preferably 14 to 28 mm, and more preferably about 21 mm. Where the inlet (70) and outlet (72) are of differing diameters, the bulge (81) at apex (83) can extend radially inwards a distance from 0.1 to 0.5 times, preferably 0.15 to 0.3 times, the diameter of the duct inlet (70). For example, where a duct inlet diameter of about 102 mm is used, the bulge (81) can extend radially inwards at apex (83) a distance $d_1$ of about 10 to 51 mm, preferably 15 to 31 mm, and more preferably about 21 mm. The bulge (81) can extend axially along the duct (34) a distance measured by angle θ from about 30 to 70 degrees, preferably about 40 to 60 degrees. In the exemplary embodiment of FIG. 9B, angle θ can be about 50 degrees.

If the duct is visualized as a "cobra head" as shown in FIG. 9A, the outer diameter of the outlet could be at the end of the X-axis, or the outlet could be centered in the fattest area of the "cobra head", or could be somewhere in between.

Preferably, the section of the direction changing duct (34) in which flow is parallel to the compressor wheel rotation axis is very short. For example, the distance $d_2$ from a center axis $C_1$ of the duct inlet (70) to the duct outlet (72) can be less than 3.0 times the diameter of the duct outlet, preferably less than 1.5 times the diameter of the duct outlet, more preferably less than 1.25 times the diameter of the duct outlet, and most preferably less than the diameter of the duct outlet. For example, where a duct outlet (9) of 93 mm is used, the distance $d_2$ from the center axis $C_1$ of the duct inlet (70) to the duct outlet (72) is preferably less than 140 mm, more preferably less than 116 mm, most preferably less than 93 mm. In the exemplary embodiment of FIGS. 7, 8 and 9, the distance $d_2$ from the center axis $C_1$ of the duct inlet (70) to the duct outlet (72) can be about 84 mm.

It should be further understood that the ranges described above are exemplary of the embodiments described herein. These ranges can be modified where efficiency or other factors dictate modification.

Figure 10:
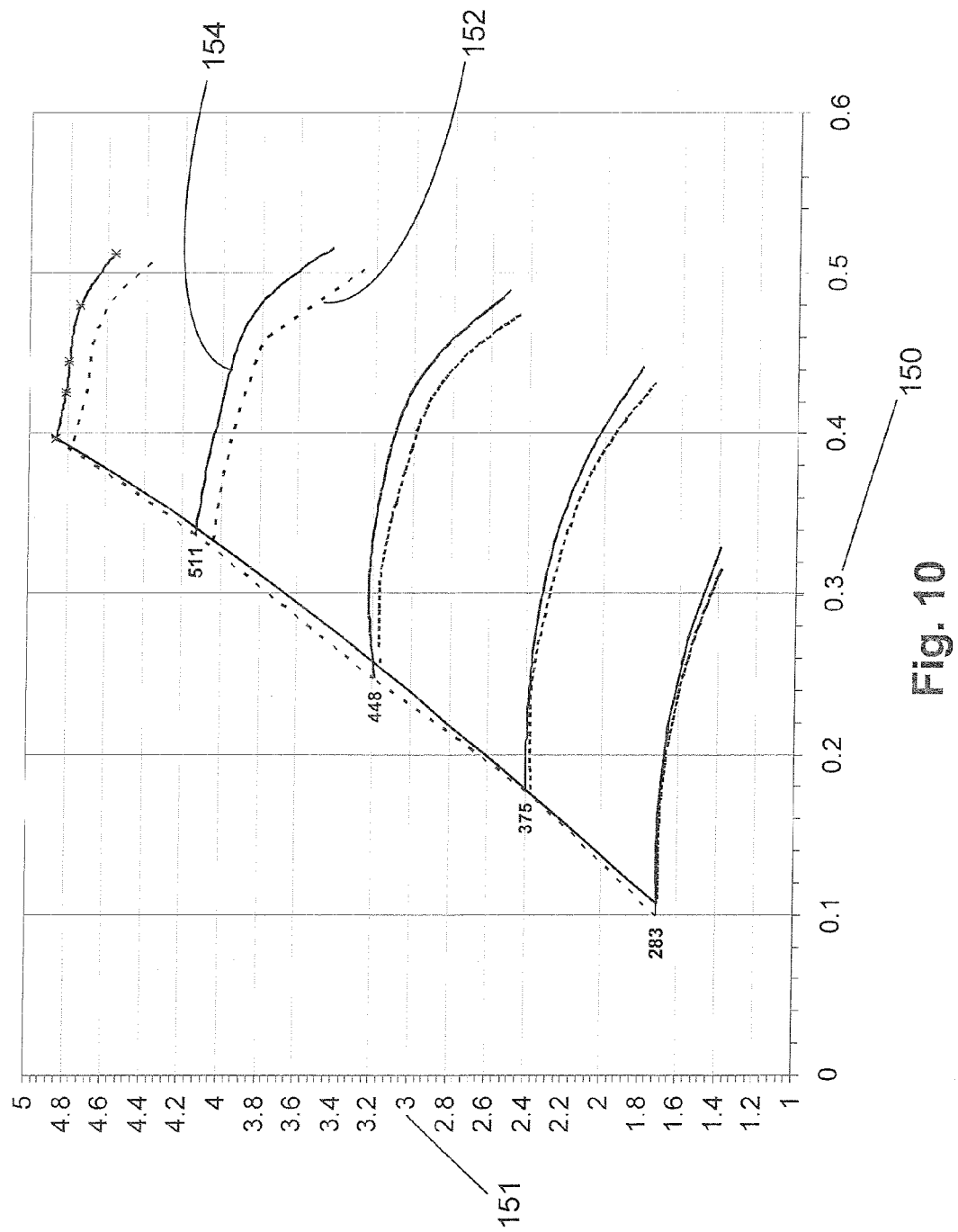
FIG. 10 is a map of pressure ratio Vs compressor mass flow comparing performance of the bend in FIG. 4 with the exemplary embodiment.

A comparison of pressure ratio vs. mass flow, from a test, for the exemplary embodiment of the direction changing duct of FIGS. 7 to 9 and the contemporary elbow of FIG. 4, is shown in FIG. 10. The X axis (150) represents corrected mass flow, the "Y" axis (151) represents pressure ratio. The map produced using the bend represented in FIG. 4 is shown as the dotted lines (152). The solid lines (154) represent the map produced using the exemplary embodiment of the direction changing duct of FIGS. 7 to 9. It can be seen that the map produced by the commercially available elbow of FIG. 4 is deficient at every important speed point in the map, compared to the map of the exemplary embodiment.

Figure 11:
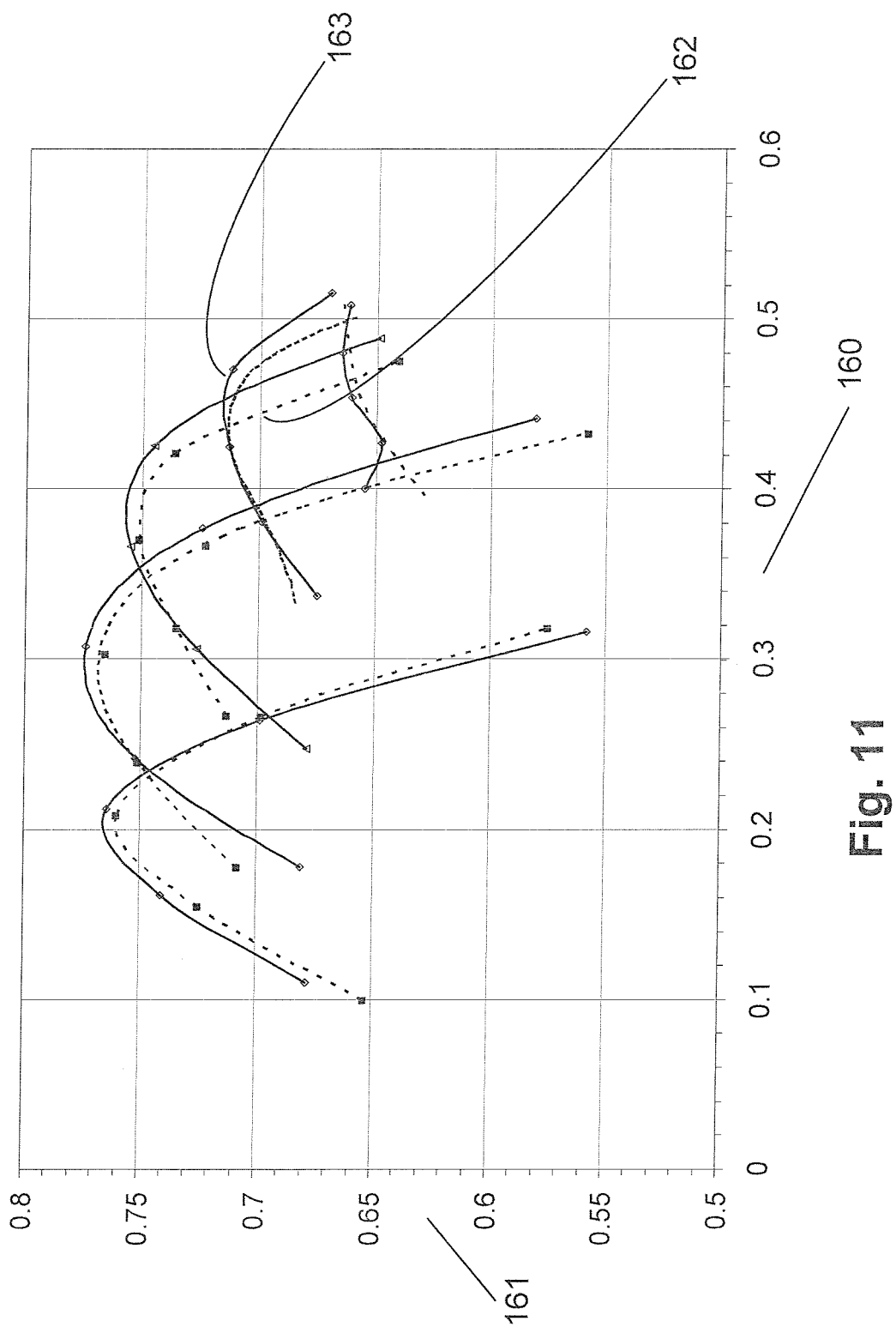
FIG. 11 is a map of peak efficiency vs pressure ratio, comparing performance of the bend in FIG. 4 with the exemplary embodiment.

FIG. 11 represents a comparison of peak efficiency vs. pressure ratio for the exemplary embodiment of the direction changing duct of FIGS. 7 to 9 and the contemporary elbow of FIG. 4. The solid lines represent the exemplary embodiment of the direction changing duct of FIGS. 7-9. The dotted lines (162) represent the peak efficiencies produced by the commercially available elbow of FIG. 4, which also shows nearly a percentage point of decrement in efficiency at each of the important points. This further shows that the inventors have a direction changing duct able to change direction of flow of a fluid in a short distance and provide a greater balance of flow and pressure over the entire outlet area, and to do this with minimal pressure drop. The direction changing duct (34) of FIGS. 7-9 provides a pressure distribution actively balanced across the inlet to compressor cover and thus to the compressor wheel, and a symmetric velocity distribution optimized similarly.

Various modifications and changes may be made by those having ordinary skill in the art without departing from the spirit and scope of this invention. Therefore, it must be understood that the illustrated embodiments of the present invention have been set forth only for the purpose of example, and that they should not be taken as limiting the invention as defined in the following claims.

Although this invention has been described in its preferred form with a certain degree of particularity with respect to turbocharger, it is understood that the present disclosure of the preferred form has been made only by way of example and that numerous changes in the details of structures and the composition of the combination may be resorted to without departing from the spirit and scope of the invention. For example, flow direction changing ducts could be for steam, plasma, heated liquids, cooled liquids, flowable solids, mixtures, or any other application where direction of flow is to be changed abruptly.

We claim:

1. A direction changing duct (34) for changing a direction of flow of a fluid, the duct (34) comprising:
a first duct section having an inlet (70) and a flow axis approximately along an axis defined as the X-axis,
a second duct section having an outlet (72), a direction of flow at said outlet approximately along an axis defined as the Y-axis perpendicular to the X-axis,
a flow direction changing segment connecting said first and second duct sections, wherein the flow direction changing segment includes
an inward bulge (81) extending into the flow direction changing segment in the direction opposite to the direction of flow at said second duct section outlet, and
outward bulges (170,171) perpendicular to the direction of flow of the first and second duct sections,
wherein said inward bulge (81) extends inward at an apex (83) a distance (d1) of from 0.1 to 0.6 times the diameter of the second duct outlet (72), said inward bulge measured along the Y-axis of a plane extending through the centerlines of the direction changing duct in the X/Y-axis, and measured in the direction opposite to the direction of flow at said second duct section outlet, and a smallest radius of from 0.5 to 2.0 times the diameter of the second duct outlet (72), and
wherein said outward bulges (170,171) extend outward in a direction perpendicular to the X-axis and the Y-axis and defined as the Z-axis relative to the first duct section a distance ($d_3$) of from 0.5 to 2.0 times a diameter of the second duct outlet (72).

2. The direction changing duct (34) as in claim 1, wherein the angle of the flow axis of the first duct section is between 60 degrees and 120 degrees relative to the direction of flow at said second duct section outlet.

3. The direction changing duct (1) as in claim 2, wherein the radius of the inner curvature at bulge apex (83) is from 0.7 to 1.2 times a diameter of the second duct outlet (72).

4. The direction changing duct (34) as in claim 2, wherein said bulge (81) at bulge apex (83) extends radially inwards a distance ($d_1$) of from 0.15 to 0.3 times a diameter of the second duct outlet (72).

5. The direction changing duct (34) as in claim 2, wherein said bulge (81) extends radially inwards at apex (83) a distance ($d_1$) from the plane of the duct outlet of from 0.2 to 0.3 times a diameter of the second duct outlet (72).

6. The direction changing duct (34) as in claim 2, wherein a length ($d_2$) of said second duct section in contact with said fluid, measured from a center axis ($C_1$) of the first duct inlet (70) to the second duct outlet (72), is less than 3 times a diameter of the second duct outlet (72).

7. The direction changing duct (34) as in claim 2, wherein a length ($d_2$) of said second duct measured from a center axis (C1) of the first duct inlet (70) to the second duct outlet (72) is less than 1.5 times a diameter of the second duct outlet (72).

8. The direction changing duct (34) as in claim 2, wherein a length (d2) of said second duct measured from a center axis ($C_1$) of the first duct inlet (70) to the second duct outlet (72) is less than 1.0 times a diameter of the second duct outlet (72).

9. The direction changing duct (34) as in claim 1, wherein the smallest radius of curvature at bulge apex (83) is from 0.6 to 1.5 times a diameter of the second duct outlet (72).

10. A turbocharger compressor inlet duct (34) for a compressor having a compressor wheel (23), the compressor wheel having a rotation axis (24), the inlet duct (34) comprising:
a first duct section having an inlet (70) and a flow axis approximately along an axis defined as the X-axis,
a second duct section having an outlet (72), a direction of flow at said outlet approximately along an axis defined as the Y-axis perpendicular to the X-axis,
a flow direction changing segment connecting said first and second duct sections,
wherein the flow direction changing segment includes
an inward bulge (81) extending into the flow direction changing segment in the direction opposite to the direction of flow at said second duct section outlet, and
outward bulges (170, 171) perpendicular to the direction of flow of the first and second duct sections,
wherein said inward bulge (81) at an apex (83) extends inward a distance ($d_1$) of from 0.1 to 0.6 times the diameter of the second duct outlet (72), from the plane of the second duct outlet, said inward bulge measured along the Y-axis of a plane extending through the centerlines of the direction changing duct in the X/Y-axis, and measured in the direction opposite to the direction of flow at said second duct section outlet, and a smallest radius of from 0.5 to 2.0 times the diameter of the second duct outlet (72), and
wherein said outward bulges (170,171) extend outward in a direction perpendicular to the X-axis and the Y-axis and defined as the Z-axis relative to the first duct section a distance ($d_3$) of from 0.2 to 1.0 times a diameter of the second duct outlet (72).

* * * * *